US009734505B2

(12) United States Patent
Benoit et al.

(10) Patent No.: US 9,734,505 B2
(45) Date of Patent: Aug. 15, 2017

(54) CONSUMER AUTHENTICATION SYSTEMS AND METHODS

(71) Applicant: Avery Dennison Corporation, Glendale, CA (US)

(72) Inventors: Dennis R. Benoit, Simpsonville, NC (US); Alan Green, Greenwood, SC (US); Mary A. Greenwood, Newport Beach, CA (US); Eva Schaefers, Muenster (DE)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/806,816

(22) Filed: Jul. 23, 2015

(65) Prior Publication Data

US 2016/0027022 A1    Jan. 28, 2016

Related U.S. Application Data

(60) Provisional application No. 62/028,876, filed on Jul. 25, 2014, provisional application No. 62/063,123, filed on Oct. 13, 2014.

(51) Int. Cl.
*G06F 17/00* (2006.01)
*G06Q 30/00* (2012.01)
(Continued)

(52) U.S. Cl.
CPC ........... *G06Q 30/018* (2013.01); *G06K 1/121* (2013.01); *G06Q 10/087* (2013.01);
(Continued)

(58) Field of Classification Search
CPC ......... G06F 19/00; G06F 17/00; G06Q 30/00; G06Q 90/00; G06Q 20/00; G06Q 10/00; G06K 19/00; G06G 1/14
(Continued)

(56) References Cited

U.S. PATENT DOCUMENTS 5,467,634 A    11/1995  Brady et al.
5,473,931 A    12/1995  Brady et al.
(Continued)

FOREIGN PATENT DOCUMENTS

FR    2991084    11/2013
GB    2328839    3/1999
(Continued)

OTHER PUBLICATIONS

International Search Report and Written Opinion issued in corresponding International Application No. PCT/US2015/041669 dated Oct. 1, 2015.
(Continued)

*Primary Examiner* — Edwyn Labaze
(74) *Attorney, Agent, or Firm* — Avery Dennison Corporation

(57) ABSTRACT

Authentication systems and related methods are described which enable consumers to conveniently determine whether an article is an authentic or legitimate article, as opposed to a counterfeit or imitation article. The systems and methods utilize electronic tags incorporated into the article and/or its packaging, and appropriately configured mobile devices such as a smart phone.

37 Claims, 7 Drawing Sheets

(51) Int. Cl.
*G06Q 10/08* (2012.01)
*G06K 1/12* (2006.01)
*G06Q 20/20* (2012.01)
*H04B 5/00* (2006.01)
*H04L 29/06* (2006.01)

(52) U.S. Cl.
CPC ....... *G06Q 10/0833* (2013.01); *G06Q 20/208* (2013.01); *H04B 5/0056* (2013.01); *H04L 63/0853* (2013.01); *H04L 63/0876* (2013.01)

(58) Field of Classification Search
USPC ............ 235/385, 375, 487; 705/22, 28, 14.3
See application file for complete search history.

(56) References Cited

U.S. PATENT DOCUMENTS

| | | |
|---|---|---|
| 5,600,760 A | 2/1997 | Pryor |
| 6,788,800 B1 | 9/2004 | Carr et al. |
| 7,042,172 B2 | 5/2006 | Dowling et al. |
| 7,187,797 B2 | 3/2007 | Sones |
| 7,375,616 B2 | 5/2008 | Rowse et al. |
| 7,417,803 B2 | 8/2008 | Costigan et al. |
| 7,519,325 B2 | 4/2009 | Wakim |
| 7,857,225 B2 | 12/2010 | Challa et al. |
| 7,864,178 B2 | 1/2011 | Marini et al. |
| 8,035,521 B2 | 10/2011 | Lees |
| 8,126,253 B2 | 2/2012 | Wallack et al. |
| 8,342,415 B2 | 1/2013 | Soh et al. |
| 8,550,335 B2 | 10/2013 | Samek et al. |
| 2005/0134436 A1 | 6/2005 | Brookner |
| 2009/0106042 A1 | 4/2009 | Maytal et al. |
| 2009/0218391 A1 | 9/2009 | He |
| 2011/0025473 A1* | 2/2011 | Rokhsaz ............. H04L 63/0853 340/10.4 |
| 2012/0130770 A1 | 5/2012 | Heffernan |
| 2012/0326847 A1 | 12/2012 | Strauman |
| 2013/0059534 A1 | 3/2013 | Sobalvarro et al. |
| 2013/0138491 A1* | 5/2013 | Gao ................... G06Q 30/0225 705/14.23 |
| 2013/0293350 A1 | 11/2013 | Hartmann |
| 2014/0025594 A1* | 1/2014 | Schmitz ............. G06Q 30/0185 705/318 |
| 2014/0113549 A1* | 4/2014 | Beg ....................... H04W 4/008 455/41.1 |
| 2014/0113560 A1* | 4/2014 | Graube ................... H04B 7/26 455/41.2 |
| 2014/0201094 A1* | 7/2014 | Herrington ........ G06K 9/00577 705/317 |
| 2014/0224867 A1 | 8/2014 | Werner et al. |

FOREIGN PATENT DOCUMENTS

| | | |
|---|---|---|
| WO | 2008/153503 | 12/2008 |
| WO | 2010/043974 | 4/2010 |

OTHER PUBLICATIONS

International Preliminary Report on Patentability issued in corresponding International Application No. PCT/US2015/041669 dated Jan. 31, 2017.

* cited by examiner

CONSUMER AUTHENTICATION SYSTEMS AND METHODS

CROSS-REFERENCE TO RELATED APPLICATION

The present application claims the benefit of U.S. Provisional Application Nos. 62/028,876 filed Jul. 25, 2014 and 62/063,123 filed Oct. 13, 2014, both of which are incorporated herein by reference in their entireties.

FIELD

The present subject matter relates to systems and methods for verifying authenticity of an article, and particularly at a point of sale. In particular versions of the subject matter, a consumer can readily verify authenticity of a product using a mobile device.

BACKGROUND

Counterfeit goods and particularly counterfeit consumer goods typically display a trademark or other indicator of source which is identical to, or cannot be readily distinguished from, a protected trademark. In many instances, counterfeit goods appear to be identical or substantially so, to a well known or popular good; however, typically manufactured using inferior materials or low cost processes. For counterfeit goods involving digital media, although the content may be identical, licensing fees and/or royalties associated with the licensed version of the work are not paid to the rightful parties. Counterfeit goods encompass all products made to closely imitate the appearance of a product of another party, so as to mislead consumers.

Although numerous anti-counterfeiting technologies have been developed, a need remains for a new strategy which enables a consumer to conveniently and quickly assess, typically at a retail venue such as a store, whether a displayed good originated from its indicated source or manufacturer.

SUMMARY

The difficulties and drawbacks associated with previously known systems are addressed in the present systems and methods.

In one aspect, the present subject matter provides a system for determining authenticity of an article having a unique item variable data (IVD) and an authentication code imprinted on at least one of the article and article packaging. The system comprises an electronic tag or device having a size and form suitable for incorporation in at least one of the article and the article packaging. The electronic tag or device retains a unique identifier (UID). The system also comprises at least one product index server for associating the IVD and the UID of the article and retaining an identifier that includes the IVD and the UID. The system also comprises at least one content management server (CMS) in communication with the product index server retaining the identifier that includes the IVD and the UID. And, the system also comprises at least one mobile device including (i) provisions for communication with the electronic tag or device incorporated in the article and/or its packaging and reading the UID of the article, and (ii) provisions for communication with the CMS. Upon communication between the mobile device and the CMS, the mobile device is configured to provide the UID read from the article to the CMS. The CMS then provides a validation code based upon the read UID to the product index server retaining the identifier. And the product index server provides information including an authentication code to the mobile device thereby enabling determination of authenticity of the article by comparison of the authentication code provided to the mobile device with the authentication code imprinted on the article.

In another aspect, the present subject matter provides a method of deriving an authentication code and applying the code to at least one of an article and packaging of the article. The method comprises acquiring item variable data (IVD) from the article. The method also comprises acquiring unique identifier(s) (UID) from an electronic device having a size and form suitable for incorporation in at least one of the article and packaging of the article. The method additionally comprises associating the IVD of the article with the UID of the article. The method also comprises generating an authentication code based upon the IVD and the UID of the article. And, the method further comprises imprinting the authentication code on at least one of the article and packaging of the article.

In yet another aspect, the present subject matter provides a method for determining whether an article is a legitimate article. The article has an electronic device incorporated within or affixed to at least one of the article and its packaging. The electronic device retains a unique identifier (UID). The article also has an authentication code imprinted thereon. The method comprises using an appropriately configured mobile device, to interrogate the article and obtain the UID. The method also comprises transferring the obtained UID from the mobile device to a system having information processing provisions and communication provisions, and requesting a validation code from the system. The method also comprises transferring the validation code from the system to the mobile device. The method additionally comprises verifying the transferred validation code corresponds to the interrogated article. If the transferred validation code corresponds to the interrogated article, then an authentication code is displayed on the mobile device. The method also comprises comparing the displayed authentication code with the authentication code imprinted on the article.

In yet another aspect, the present subject matter provides a method for determining whether an article is a legitimate article. The article contains an authentication code and has an electronic device incorporated within or affixed to one of the article and its packaging. The electronic device retains a unique identifier (UID). The method comprises providing a system including a content management server (CMS) and a product index server in communication with the CMS. The method also comprises providing a mobile device configured to interrogate the electronic device. The method additionally comprises using the mobile device, interrogating the electronic device and acquiring the UID of the article. The method also comprises transmitting the acquired UID from the mobile device to the CMS of the system. The method also comprises providing a validation code from the CMS to the product index server of the system. The validation code corresponds to the transmitted acquired UID. The method also comprises providing an authentication code from the product index server to the mobile device. And, the method additionally comprises displaying the authentication code on the mobile device.

As will be realized, the subject matter described herein is capable of other and different embodiments and its several details are capable of modifications in various respects, all without departing from the claimed subject matter. Accord-

DETAILED DESCRIPTION OF THE EMBODIMENTS

Figure 1:
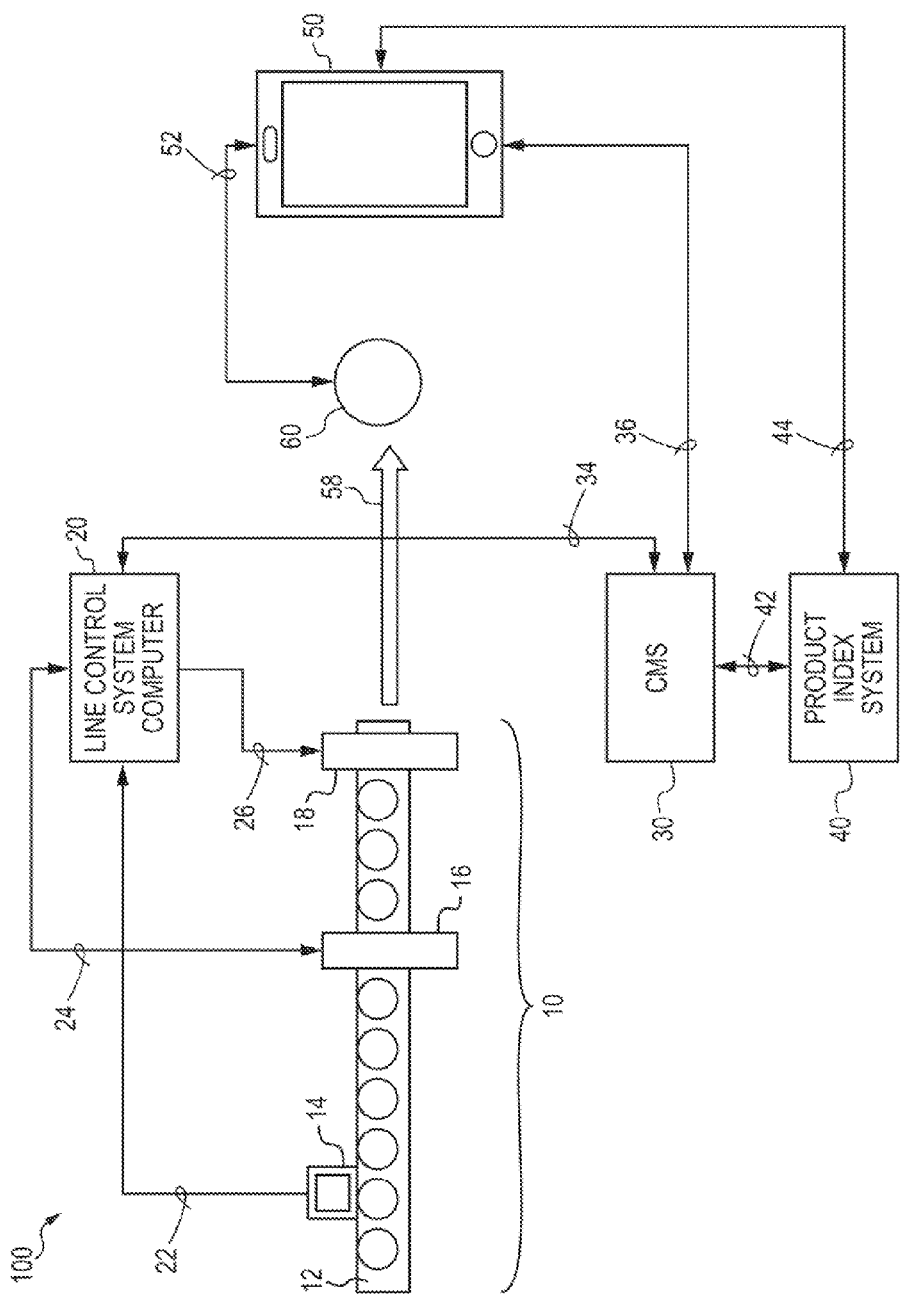
FIG. 1 is a schematic overview of an embodiment of a consumer authentication system in accordance with the present subject matter.

The present subject matter provides systems and methods for verifying that an article or product of interest is in fact a legitimate article and thus, not a counterfeit or imitation. In certain embodiments of the present subject matter, the authenticity of an article or product of interest can be verified at a point of sale such as a retail venue. And, in many embodiments, a user such as a consumer or potential purchaser of the article of interest can use a mobile device such as a smart phone to verify whether the article is a legitimate article.

The term "legitimate" as used herein and with regard to an article or products, refers to the article being as indicated or described by its labeling, packaging, and/or as promoted by its seller. Typically, most articles contain labeling and/or packaging that indicate their identity and/or source. An article is a legitimate article as described herein if the identity and/or source of the article is as represented or indicated on the labeling and/or packaging associated with the article.

In certain embodiments, the present subject matter provides systems that may be consolidated with manufacturing lines for consumer products in a variety of product categories including but not limited to health and beauty, wine and spirits, beverages, pharmaceuticals, durable goods and food for example. Such lines typically involve the movement of packaging through a series of operations that combine the product of interest with packaging materials used to transport, dispense and/or hold the product until use. Often unique information is associated with the manufactured product, such as a batch number, serial number or the like. This information can be used for a variety of logistical or regulatory uses. This information is referred to herein as "item variable data" ("IVD") and can be captured digitally, for example with the use of a vision system and electronically stored in a database as a reference to the specific item.

In a number of instances it is desirable to incorporate into the packaged product an electronic tag or device which contains information. Such tags or devices typically utilize radio frequency technology to read and/or write information into the electronic tag. The electronic device has a size and form suitable for incorporating the device into the article and/or its packaging. An example of an electronic tag is an NFC tag described in greater detail herein. In certain instances, the electronic devices include integrated circuit chips which also have a unique serialization separate from the item variable data (IVD). The information associated with the electronic tag and/or circuit chip is referred to herein as "unique identifications" or a "unique identifier" ("UID") and can likewise be captured and associated with a separate and distinct IVD.

Further, once the system associates the IVD and UID, a third unique identifier or "item validation symbology" (IVS) can be derived, and particularly through secure encryption technologies or other algorithms that minimize the predictability of the IVS. The generated IVS is likewise captured in the database as an item unique record inclusive of the UID and IVD.

In open commercial environments, such as retail venues and various point of sale locations, a consumer can use an NFC enabled device to interrogate an NFC electronic tag incorporated with the product of interest at the time of manufacture to receive a variety of useful content and information. Typically, interrogation is performed by "tapping" the NFC tag using an NFC mobile device such as a smart phone. General content which can be delivered to the mobile device includes information relating to electronic customer relations management (ECRM) or incentives such as coupons or other marketing practices to influence a purchase decision.

Often an important purchase criteria is believing that the article, especially if the article is a highly valued product such as a high end wine or spirit, or cosmetic, is an authentic product. The previously mentioned content which can be delivered to the mobile device can include a feature that will allow the consumer to fetch the IVD, UID, and/or another identifier or code associated with the article of interest, which will appear on the display of the mobile device. The consumer can then compare the displayed value with the value on the article which had been associated with the article at the time of manufacture. Thus, by performing such comparison, the consumer can readily, easily, conveniently, and quickly validate or verify that the article is a legitimate product as opposed to a counterfeit product. Because the value(s) or identifier(s) on the article were associated with the article at the time of manufacture and/or packaging of the article, the consumer can be relatively confident that the article is a legitimate product.

The present subject matter includes several variations that can occur in terms of the data association, how the data and/or information is delivered to the mobile device, how the data and/or information is applied to the article, along with variations in the system configuration and methods. In general the ability to remotely associate symbology or identification to an article of interest is a convenient, rapid and easy to use methodology to provide consumer confidence in the product's authenticity.

Item Variable Data (IVD)

As previously described, nonlimiting examples of item variable data (IVD) can include batch numbers or serial numbers. IVDs are identifiers that serve to identify one or more items. Typically, IVDs are unique identifiers and provide identification of one or more articles, items, or products of interest. IVDs may also provide identification of one or more components of an article, item, or product of interest. IVDs can also provide identification of one or more groups or collections of multiple articles, items, or products of interest.

An IVD can comprise alphabetic characters, numeric characters, letters, digits, characters, symbols, and combinations thereof. Typically, an IVD includes a collection of letters and/or numbers and may range from 1 or 2 digits and/or letters up to a relatively large string or sequence such as for example up to 8, 10, 12, 14, 16, or more digits and/or letters.

In many versions of the present subject matter, the IVD is in the form of a sequence of alphanumeric characters, e.g., 0-9 and/or A-Z, which serve to identify a unique article from other articles which are identical or similar to the identified article. Often, and in many applications, the articles are identical to each other because they are manufactured using a common manufacturing process and materials, and a goal of their manufacture is manufacturing consistency.

In certain embodiments of the present subject matter, the IVD identifiers are displayed on or incorporated within an article and/or its packaging. However, the present subject matter includes practices in which IVDs are not visually perceptible on the article and/or its packaging. It is also contemplated that IVD information can be incorporated within an article and not readily available for viewing or inspection. And, in still other embodiments of the present subject matter, IVD information can be remotely or virtually associated with an article.

Unique Identifiers (UID)

As previously described, unique identifiers or unique identifications (UID) provide another way to identify or designate particular products. UIDs typically include information which is incorporated into an electronic tag and/or chip or other electronic component, which is associated with the item(s) of interest.

The electronic tag, chip, or component can be associated with the item(s) of interest in a variety of ways. In one embodiment, the tag, chip, or component is physically incorporated with or into the product and/or its packaging. Incorporation can be permanent or temporary. The tag, chip, or component can be affixed to the product and/or its packaging by physical affixment, adhering using adhesives, and/or incorporation during manufacturing and/or packaging.

The UIDs can include a series or sequence of characters, numbers, letters, digits, symbols, and combinations thereof as previously described in association with IVDs. The UIDs typically include information pertaining to the articles, items, or products of interest. Nonlimiting examples of such information include manufacturing date, expiration date(s), identification of manufacturer(s) or distributer(s), geographical information, storage instructions or warnings, use instructions or warnings, disposal instructions or warnings, regulatory information, health and environmental information, and a wide array of other types of information.

Item Validation Symbology (IVS)

In certain embodiments of the present subject matter, the IVD and the UID of an article are associated with one another. The resulting association is stored in the system for subsequent retrieval, as described in greater detail herein.

Item validation symbology (IVS) can be used to provide an encrypted identifier or record that includes the IVD and the UID. The IVS identifier or record is stored in the system. As described in greater detail herein, upon establishing a permitted communication with a mobile device, information from the system which may include the IVS identifier is provided to the mobile device.

In certain embodiments of the present subject matter, the IVS identifier is derived or generated using secure encryption technologies or other algorithms that reduce the potential for predicting the IVS identifier, the IVD, and/or the UID. The generated and typically encrypted IVS identifier is stored in a system database as an item unique record inclusive of the UID and the IVD.

The identifier or encrypted identifier may be in a wide array of different forms or formats depending upon the information to be included, the field of commerce, practices within the industry, and/or other factors. Nonlimiting examples of IVS identifiers include but are not limited to barcodes and matrix codes. Representative barcodes may include linear barcodes such as those derived using Code 25, Code 39 (International Standard ISO/IEC 16388), Code 93, Code 128 (International Standard ISO/IEC 15417), CPC Binary, DUN 14, EAN-2, EAN-5, EAN-8, and EAN-13 (International Standard ISO/IEC 15420), Facing Identification Marks, GS1, HIBC, Intelligent Mail Barcode, ITF-14, JAN, Latent Image Barcode, MSI, Pharmacode, PLANET, PLESSEY, Postbar, POSTNET, RM4SCC/KIX, Telepen, and Universal Product Code (UPC). Representative matrix codes may include 3-DI developed by Lynn Ltd., ArrayTag from Array Tech Systems, AugTag, Aztec Code from Honeywell (ISO/IEC 24778), Beetagg from Connvision, Codablock, Code 1, Code 16K, Code 49 from Intermec Corp., ColorCode also known as ColorZip, Color Construct Code, Compact Matrix Code from Syscan Group, Inc., CP Code from CP Tron, Inc., Cyber Code from Sony, d-Touch, DataGlyphs from Xerox PARC, DataMatrix from Microscan Systems, Datastrip Code from Datastrip Inc., Digital Paper, Dot Code A, EZcode from SanLife, Grid Matrix Code from Syscan Group, Inc., HD Barcode from Complete Inspection Systems, Inc., High Capacity Color Barcode from Microsoft, HueCode from Robot Design Associates, Inc., INTACTA.CODE from INTACTA Technologies, InterCode from Icon Lab Inc., JAGTAG from JAGTAG Inc., MaxiCode, mCode, MiniCode, MicroPDF417, NexCode, Nintendo eReader#Dot code, Optar from Twibright Labs, PaperDisk from Cobblestone Software, PDMark from Ardaco, Qcode, QR Code, Quick Mark Code, Secure Seal, Smart Code from Infolmaging Technologies, Snowflake Code from Marconi Data Systems, Shot Code, SPARQCode from MSKYNET Inc., SuperCode, TrillCode from Lark Computers, UltraCode, UnisCode, VeriCode from Veritec Inc., VSCode from Veritec Inc., and WaterCode from MarkAny Inc.

NFC Tags and Other Electronic Devices

In certain embodiments of the present subject matter, a system as described herein is provided for articles, products, or items using NFC communications. Generally, one or more NFC-enabled tags are incorporated or otherwise affixed to an article of interest. In many embodiments of the present subject matter, upon interrogation of an NFC tag by an NFC device, the IVS identifier and particularly an encrypted IVS identifier is provided from the system to the mobile device. The mobile device having been provided with necessary encryption key(s), obtains information associated with the IVS identifier. Typically, the IVS identifier or information includes one or both of the IVD and/or the UID. In certain embodiments, a database or other record retention means is updated upon an NFC device or other high frequency-enabled device interrogating the NFC tag. In particular embodiments of the present subject matter, the NFC tag transmits a directing Uniform Resource Locator (URL) or other information to the mobile device. Upon communication between the mobile device and the database, information regarding the article is transferred from the device to the database and the database is updated. Record(s) of the transfer and/or update are optionally established.

NFC is a set of short range wireless technologies, typically requiring a distance of 20 cm or less. NFC operates at 13.56 MHz on ISO/IEC 18000-3 air interface and at rates ranging from 106 kbit/s to 424 kbit/s. NFC involves an initiator and a target. The initiator actively generates an RF field that can power a passive target. This enables NFC targets to take very simple form factors such as tags, stickers, key fobs, or cards that do not require batteries. NFC peer-to-peer communication is possible, provided both devices are powered.

NFC tags contain data and are typically read-only, but may be rewriteable. They can be custom encoded by their manufacturers or use the specifications provided by the NFC Forum, an industry association charged with promoting the technology and setting key standards. The tags can securely store personal data such as debit and credit card information, loyalty program data, PINs and networking contacts, among other information. The NFC Forum defines four types of tags that provide different communication speeds and capabilities in terms of configurability, memory, security, data retention and write endurance. Tags currently offer between 96 and 4,096 bytes of memory.

As with proximity card technology, near-field communication uses magnetic induction between two loop antennas located within each other's near field, effectively forming an air-core transformer. Near-field communication operates within the globally available and unlicensed radio frequency ISM band of 13.56 MHz. Most of the RF energy is concentrated in the allowed ±7 kHz bandwidth range, but the full spectral envelope may be as wide as about 1.8 MHz when using ASK modulation. Supported data rates include 106, 212 or 424 kbit/s (the bit rate 848 kbit/s is not compliant with the standard ISO/IEC 18092).

There are two modes for NFC. In a passive communication mode, the initiator device provides a carrier field and the target device answers by modulating the existing field. In this mode, the target device may draw its operating power from the initiator-provided electromagnetic field, thus making the target device a transponder. In an active communication mode; both initiator and target device communicate by alternately generating their own fields. A device deactivates its RF field while it is waiting for data. In this mode, both devices typically have power supplies. As described herein, the present subject matter typically involves an NFC-enabled (or HF-enabled) device as an initiator, and an unpowered NFC tag incorporated in an article, product, and/or related packaging as a target. Hence communication occurs via a passive mode. However, the present subject matter also includes systems using an active communication mode.

It will be appreciated that the present subject matter includes a wide array of other electronic devices such as for example RFID devices or tags, low energy BLUETOOTH devices (LEBs), and infrared (IR) devices. If the system utilizes such devices, an appropriate reader or receiver will be utilized.

Representative Systems and Methods

FIG. 1 is schematic illustration of a consumer authentication system 100 in accordance with an embodiment of the present subject matter. The system 100 generally comprises a line control system computer 20 at least partially interfaced with a manufacturing line 10, a content management server (CMS) 30, a product index server or system 40, and one or more mobile devices 50.

Although FIG. 1 schematically illustrates a manufacturing line 10, it will be appreciated that the system 100 can be used with a variety of packaging, assembly, and/or sorting processes and systems (collectively referred to as a "line" or "processing line" herein). The manufacturing line 10 typically produces a plurality of articles which after their transport or entrance into commerce, collectively shown as arrow 58, become articles of interest 60. The manufacturing line 10 typically includes one or more product and/or packaging or packaging material transport assemblies 12 which could for example be in the form of conveyors or the like. The transport assembly 12 typically transports one or more articles past one or more of the following. The manufacturing line 10 also includes one or more vision systems 14, one or more electronic encoders and/or readers 16 which may for example be NFC encoders and/or readers, and one or more imprinters 18. The vision system(s) 14 are in communication with the line control system computer 20 via one or more information paths 22. The term "information path" as used herein refers to one or more data communication links which provide rapid and accurate transmission of digital data. Nonlimiting examples of information paths include wireless and cable data transmission systems. Such systems may be in the form of networks which can include mobile phone networks, dedicated or private data networks, satellite based networks, and internet based systems. The vision system(s) 14 typically acquire information concerning the article such as their IVD. The vision system(s) 14 can acquire a single IVD or multiple IVDs associated with an article and/or its packaging. Additional aspects of the vision system(s) and their operation are provided herein. The electronic encoder(s) and/or reader(s) 16 are in communication with the line control system computer 20 via one or more information paths 24. The encoder(s)/reader(s) 16 typically impart information such as the UID to an NFC tag and/or read information from the tag relating to details of the article such as the UID as previously noted. And, the imprinter(s) 18 are in communication with the line control system computer 20 via one or more information paths 26. The imprinter(s) print or otherwise apply one or more authentication codes to each article and/or associated packaging. As explained in greater detail herein, the authentication codes are unique visible codes, marks, indicia, symbols or designations associated with an article and are used to verify that the article is a legitimate product from its designated source or manufacturer and is not a counterfeit or forgery.

Vision systems or machine vision systems are computer based imaging systems that are typically used in automatic inspection, object recognition, and analyses. Vision systems generally comprise one or more image acquisition components and can include cameras, lenses, and lighting. Vision systems generally also comprise digital imaging processing provisions to extract the desired or relevant information from acquired image(s). Two dimensional imaging using visible light, infrared light, line scan imaging, and other technologies can be used. Three dimensional imaging of surfaces and x-ray imaging can also be used. A wide array of image processing provisions and/or techniques can be used such as "stitching" or registration, filtering, thresholding, pixel counting, segmentation, edge detection, color analysis, "blob" discovery and manipulation, neural net processing, pattern recognition, symbol recognition, optical character recognition, gauging/metrology, and comparison against target values. Details of machine vision systems, equipment and methods are described in U.S. Pat. Nos. 5,467,634; 5,473,931; 5,600,760; 7,042,172; 7,187,797; 7,417,803; 7,864,178; and 8,126,253.

The electronic encoders and/or readers 16 impart information to, or read information from, one or more electronic devices such as NFC tags for example that are incorporated in an article or its packaging. As previously noted, NFC encoders and/or readers are available and are described in U.S. Pat. Nos. 7,375,616; 7,519,325; 7,857,225; 8,035,521; 8,342,415; and 8,550,335.

A wide array of printers, markers, and/or labeling devices may be used for the imprinter(s) 18. Combinations of these devices and optionally with other components can be used. As previously described, the imprinter(s) apply a visible identifier which includes a unique authentication code to each article from the line 10. Typically, the imprinter can be in the form of a printer that applies inks or pigment-containing materials to the article and/or its packaging. However, the present subject matter provides and/or includes the use of other devices to apply a visible indicator which includes the authentication code, on the article and/or its packaging. For example, the imprinter can be in the form of an embosser or other surface profile modifying device. Thus, the outer surface of the article and/or its packaging could be modified through the formation of ridges, depressions, and/or valleys; or by forming raised projections, ridges, or plateaus; or combinations of these features. The resulting surface modification is visible and includes the article's authentication code. The present subject matter also includes applying one or more labels that include the authentication code(s) or which receive such codes in a subsequent printing.

As noted, the system 100 comprises a content management server (CMS) 30. The server 30 is in communication with the line control system computer 20 via one or more information paths 34. The content management server 30 is typically in the form of one or more computer servers including electronic processing provisions, data storage provisions, interface and communication provisions. In many embodiments and as described in greater detail herein, the content management server receives data from a mobile device after interrogating an article. The content management server then requests a validation code from the system for subsequent transfer to the mobile device. The content management server can also, in certain embodiments, provide companion content or other information such as information about the article, its use, and/or the manufacturer or seller of the article. In certain embodiments, the content management server 30 is in communication with the product index system 40, and is configured to provide a validation code based upon reading an electronic tag from an article of interest. These aspects are described in greater detail herein.

As noted, the system 100 also comprises a product index system 40. The product index system 40 is typically in communication with the content management server 30 via one or more information paths 42. The product index system 40 is typically in the form of one or more computer servers including processing provisions, data storage provisions, interface and communication provisions. In certain embodiments, the product index system 40 receives a request for a validation code from the content management server 30 regarding a particular item, such as an item previously interrogated by a consumer. The validation code request from the content management server typically includes data regarding the specific article such as the article's IVD and/or UID. The validation code request may also include other data such as data regarding the mobile device. Upon assessment and optional evaluation of the data, the product index system provides one or more validation codes to the mobile device. In certain embodiments, the product index system is configured to associate the IVD and the UID of a particular article and retain a unique identifier that includes the IVD and the UID.

As noted, the system 100 also comprises one or more mobile devices 50. The mobile devices 50 are in communication with the content management server 30 via one or more communication paths 36. And, the mobile devices 50 are in communication with the product index system 40 via one or more information paths 44.

The mobile device 50 is associated with one or more components of the system, and may for example comprise a mobile telephone owned by a person. The mobile device 50 includes a memory and may be pre-provisioned with information that represents the identity of the entity associated with the mobile device 50. Typically, the mobile device 50 also stores a unique device ID value that allows the device to be identified, for example by use of an International Mobile Equipment Identify (MEI) value associated with the mobile device 50.

The mobile device 50 comprises input means, such as a keyboard, which may comprise a physical keyboard or one displayed on a touchscreen interface, along with a display screen and includes a processor capable of executing one or more application(s) such as identification application(s) stored in the memory of the device.

The mobile device 50 may be any type of mobile device. In particular, although not exclusively, the mobile device 50 may be any of a mobile telephone, a smart phone, a personal digital assistant, a tablet computer, or the like. In some embodiments, the mobile device 50 includes a software module or component or "app" as known in the art. The software module may be a Java applet which is stored on the mobile device prior to executing a method according to an embodiment described herein. The software module may be provided as part of the firmware of the mobile device 50 or may be downloaded to the mobile device via a network connection, for example from an application store, i.e. a repository of applications. In certain embodiments, the mobile device is configured to provide the UID that is read from an article of interest, to the content management server. The content management server then provides a validation code based upon the read UID to the product index system retaining the identifier. The product index system then provides information including an authentication code to the mobile device. This enables determination of article authenticity by comparing the authentication code provided to the mobile device with the authentication code printed on the article.

FIG. 1 also illustrates communication between the one or more mobile device(s) 50 and one or more articles of interest 60. As described herein, the mobile device 50 can communicate with the article 60 via one or more information paths 52. For embodiments in which the article 60 includes one or more NFC tags, an initial interrogation from the mobile device 50 to the article 60 including the tag occurs via path 52. And a response from the tag occurs via path 52. These aspects are described in greater detail herein.

Figure 2:
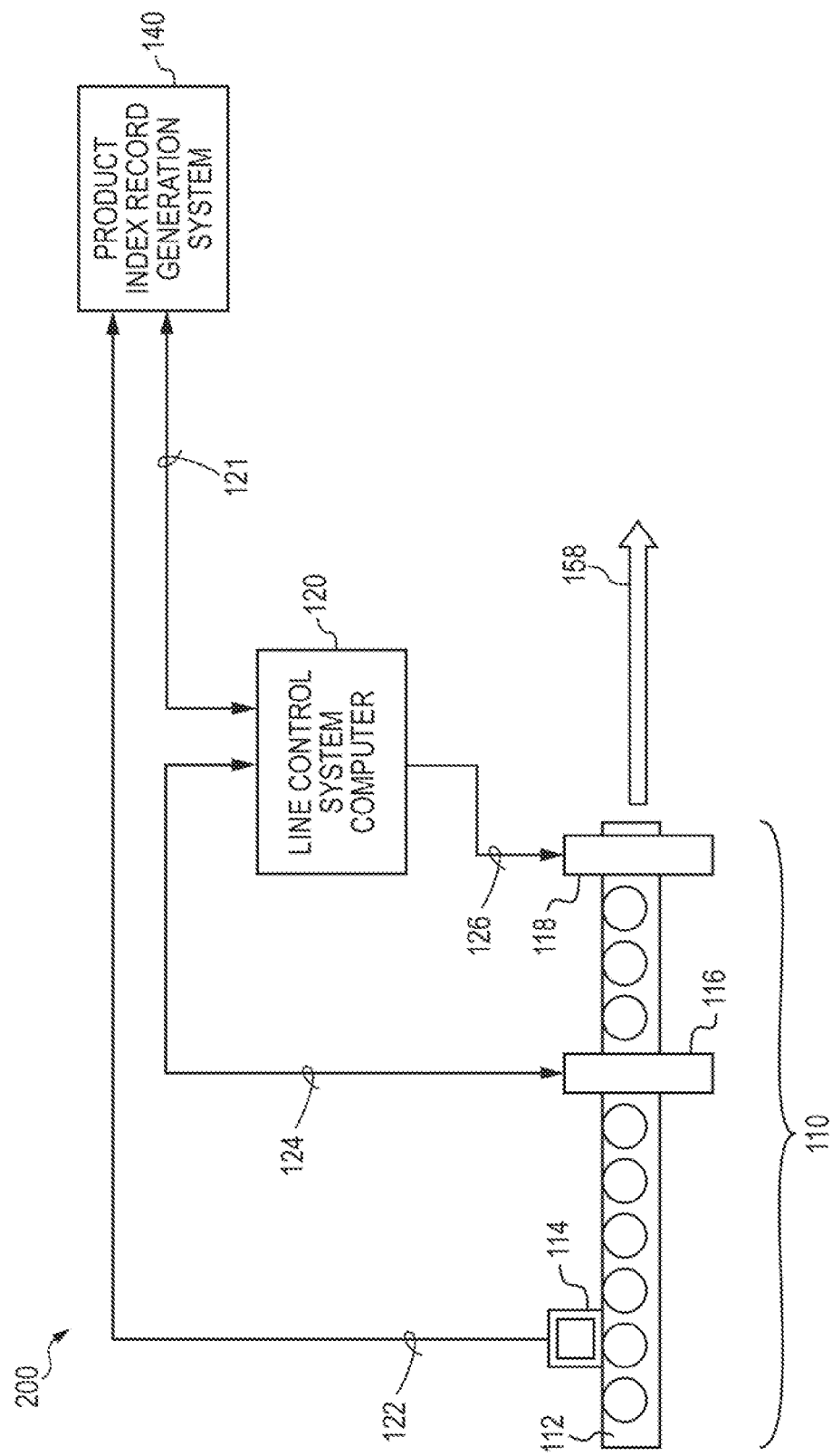
FIG. 2 is a schematic overview of an embodiment of a product indexing system in accordance with the present subject matter.

FIG. 2 is a schematic illustration of an embodiment of a product indexing system 200 in accordance with an embodiment of the present subject matter. Generally, the product indexing system 200 comprises one or more components associated with a packaging or manufacturing line 110, a line control system computer 120, and a product index record generation system 140. The line 110 typically provides a plurality of tag-containing and monitored articles for commerce or other destination 158.

Nonlimiting examples of components associated with a packaging or manufacturing line 110 include one or more transport assemblies 112, one or more vision systems 114, one or more electronic encoders and/or readers 116 which could be in the form of NFC encoders and/or readers, and one or more imprinters 118. In certain embodiments, the manufacturing line 110 and its components can be the same or similar to the previously described line 10 and associated components of FIG. 1.

The line control system computer 120 is in communication with the electronic encoder(s) and/or reader(s) 116 via one or more information paths 124. The line control system 120 is in communication with the imprinter(s) 118 via one or more information paths 126. The line control system computer can be in the form of the previously described line control system computer 20.

The product index record generation system 140 is in communication with the vision system(s) 114 via one or more information paths 122. The product index record generation system 140 is in communication with the line control system computer 120 via one or more information paths 121. And, the product index record generation system 140 is in communication with the line control system computer 120 and/or the imprinter(s) 118 via one or more information paths 121, 126.

In certain embodiments, the line control system computer 120 and the product index record generation system 140 are provided in the form of a combined processing and control system such as the line control system computer 20 of system 100 in FIG. 1.

Referring to the system 200 depicted in FIG. 2, as an article proceeds through the line 110, one or more item variable data (IVD) associated with the article is acquired by the machine vision system 114. The IVD and optionally additional information concerning the article is provided to the product index record generation system 140 via information path 122. The article proceeds along the line 110 to the electronic encoder and/or reader 116 which in many embodiments is an NFC encoder and/or reader and data or information concerning an electronic tag or NFC tag incorporated in the article and/or its packaging is acquired. That data is provided to the line control system computer 120 via the information path 124.

The line control system computer 120 provides data and/or information concerning the electronic tag and/or chip which typically is in the form of the UID for the particular article, to the product index record generation system 140.

Upon receipt of the IVD and the UID, the product index record generation system 140 generates or derives one or more authentication codes to the line control system computer 120 and/or the imprinter 118, via the information paths 121, 126. The imprinter 118 then prints, applies, forms, or otherwise deposits the authentication code on the particular article.

Figure 3:
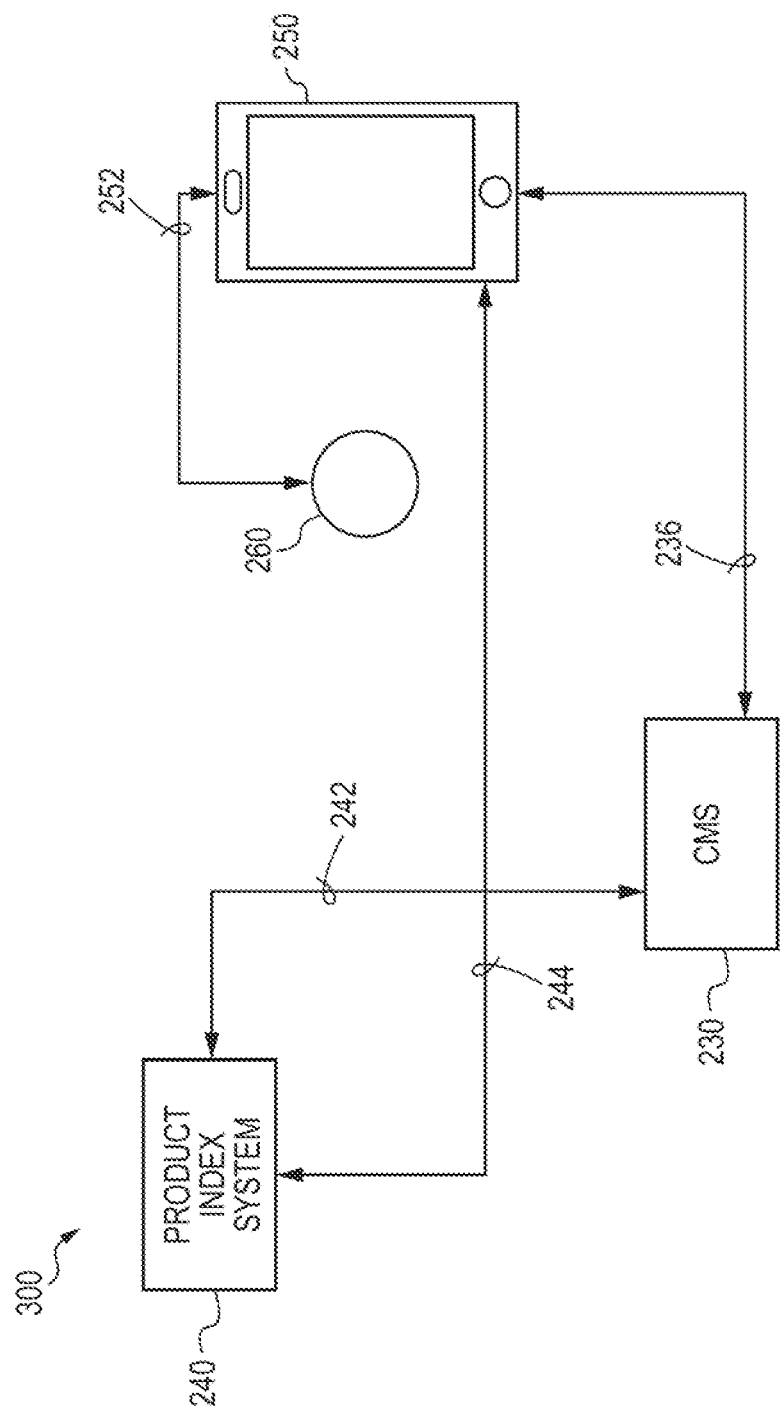
FIG. 3 is a schematic overview of an embodiment of a consumer validation system in accordance with the present subject matter.

FIG. 3 is a schematic illustration of an embodiment of a consumer validation system 300 in accordance with an embodiment of the present subject matter. Generally, the consumer validation system 300 comprises a content management server (CMS) 230, a product index system 240, and one or more mobile devices 250.

The product index system 240 is in communication with the content management server 230 via one or more information paths 242. The product index system 240 is in communication with the mobile device(s) 250 via one or more information paths 244. The product index system 240 can be the same or similar as the previously described product index system 40 of system 100 illustrated in FIG. 1. In certain embodiments of the present subject matter, the product index system 240 receives validation code request(s) from the content management server 230. The requests typically include data including one or both of the IVD and the UID of an article of interest. The data may also include information and/or identifiers associated with a mobile device such as device 250 interrogating the article. The product index system may perform one or more evaluations of the validation code request such as for example security checks, prior to issuing the validation code.

Upon issuing the validation code, that data is provided from the product index system 240 to the mobile device 250 via the information path 244. As previously described, the validation code typically includes information that is subsequently viewed on the mobile device enabling a consumer to verify or confirm that the article of interest is a legitimate article. An example of the noted information includes the previously noted authentication code. The information can also include one or both of the IVS and/or the UID.

The content management server 230 is in communication with the mobile device(s) 250 via one or more information paths, 236. In certain embodiments of the present subject matter, the content management server 230 receives data from the mobile device 250 after and/or during interrogation of an article by the mobile device. Interrogation of an article 260 can for example occur by the mobile device interrogating or tapping an electronic tag associated with the article 260, shown as 252. The response from the tag is received by the device. The information provided to the content management server 230 from the mobile device 250 typically includes the IVD and/or UID associated with the article and optionally may include information concerning the mobile device. The content management server 230 evaluates the information and issues a validation code request to the product index system 240. The content management server 230 may also provide additional information to the mobile device 250.

Exemplary embodiments utilizing data transfer may allow for the transmission of data from an electronic device, such as a radio frequency identification (RFID) tag or other device capable of transmitting data, for example utilizing near field communication (NFC), such as a NFC RFID tag. In some further exemplary embodiments, a mobile device, which may be a mobile phone, a smart phone, a tablet, a personal computer (PC) or other device with a scanner or reader, may be capable of reading a NFC RFID tag, collecting information and data from the NFC RFID tag, and redirect a user of the mobile device to a particular server, database, website, or software application. In an additional embodiment, a stationary device, such as a cash register, payment station, stationary NFC payment terminal, stationary multi-media payment terminal reader, and stationary NFC reader may be capable of reading a NFC RFID tag, collecting information and data from the NFC RFID tag, and redirect a user of the mobile device to a particular server, database, website, or software application.

Figure 4:
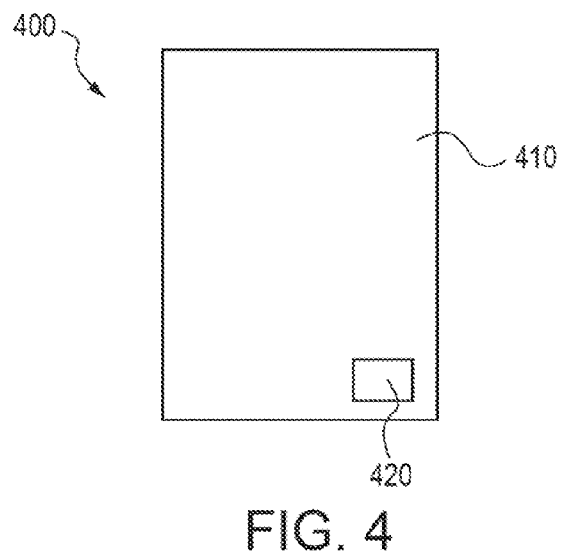
FIG. 4 is a schematic view of an article having an NFC tag affixed or incorporated therein in accordance with an embodiment of the present subject matter.
Figure 5:
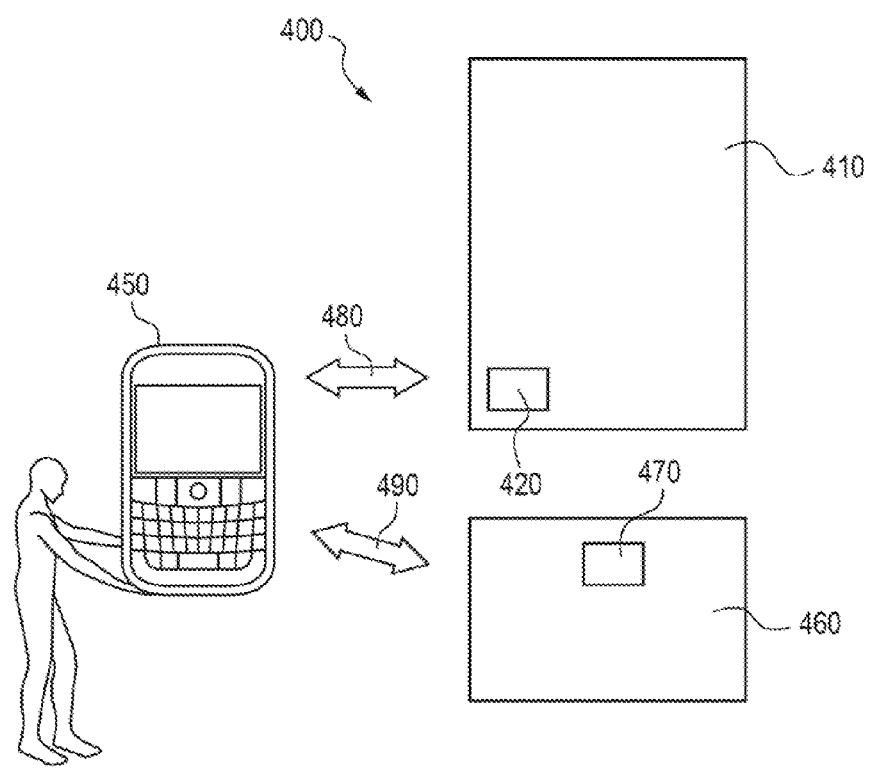
FIG. 5 is a schematic view of a system and related method of embodiments of the present subject matter illustrating communication between an NFC enabled reader and an article containing an NFC tag.

In one exemplary embodiment 400 and according to FIGS. 4 and 5, a NFC-enabled smart phone 450 may communicate with a NFC tag 420 or NFC RFID tag 420 associated with an article 410. It should however be understood that this is an exemplary embodiment and any other device can be used that has a scanner or reader associated with the device.

Generally, in accordance with the present subject matter, one or more tags are affixed, incorporated with or within, or otherwise associated with article(s) to be tracked or interrogated with NFC-enabled devices as described herein. When used herein, the term "tag" can refer to an inlay in which an antenna and chip are placed on a substrate (for example an article or its packaging which can be PET, paper, etc.) and may be covered by a second substrate to encase the antenna and chip or only portions thereof. The inlay may be provided with adhesive or "dry" with no adhesive. In addition, a tag may refer to a hang tag such as found with apparel items, a label which may be applied to a surface, or other structure which may be used to hold, contain or retain the NFC RFID device.

In one exemplary embodiment, a user of a mobile phone or portable device 450, who may be a consumer, can interrogate, "tap" or otherwise position their NFC-enabled phone 450 proximate to an article 410 labeled with a NFC RFID tag 420 to access information, as shown in exemplary FIGS. 4 and 5. Accessing information from the tag 420 or interrogating the tag can be performed via a wireless communication link 480. It should be understood, that while the present subject matter is directed to consumer or commercial applications, the presently described subject matter may also be used for compliance and monitoring purposes, or any other use where it may be helpful to transfer data.

The NFC-enabled phone or device 450 may also have a software application associated with NFC readers, as described herein. Any such information may then be received by the NFC-enabled phone or device 450 and displayed thereon or transmitted via a wireless communication link 490 to another device or location for display, for example to a database 470 contained on one or more remote servers 460. In certain embodiments, the NFC-enabled device is a smart phone. In many embodiments of the present subject matter, the NFC-enabled device is configured to transfer information acquired from tag(s) associated with objects and/or documents to one or more remote servers or other computing facilities or data storage provisions. Communication can be via the internet, using telephone, satellite, or other networks or modes of communication. Typically, in many embodiments, the information transferred from the NFC-enabled device to the one or more servers is related to the articles and/or products interrogated by the NFC-enabled device.

In other exemplary embodiments, NFC RFID tag 420 may have a unique identifier (UID) that is related to a specific or individual article. Additionally, the ability to use unique identifiers may allow for additional levels of security and authentication, for example allowing a user or consumer to determine if an article or product is authentic or legitimate. Also, still further exemplary embodiments may allow for NFC RFID tags 420 to have read-write capabilities. For example, NFC RFID tags 420 may be such that they only provide data to a user when read. However, as desired, a tag may allow for writing so that a user can write information to a tag 420.

Figure 6:
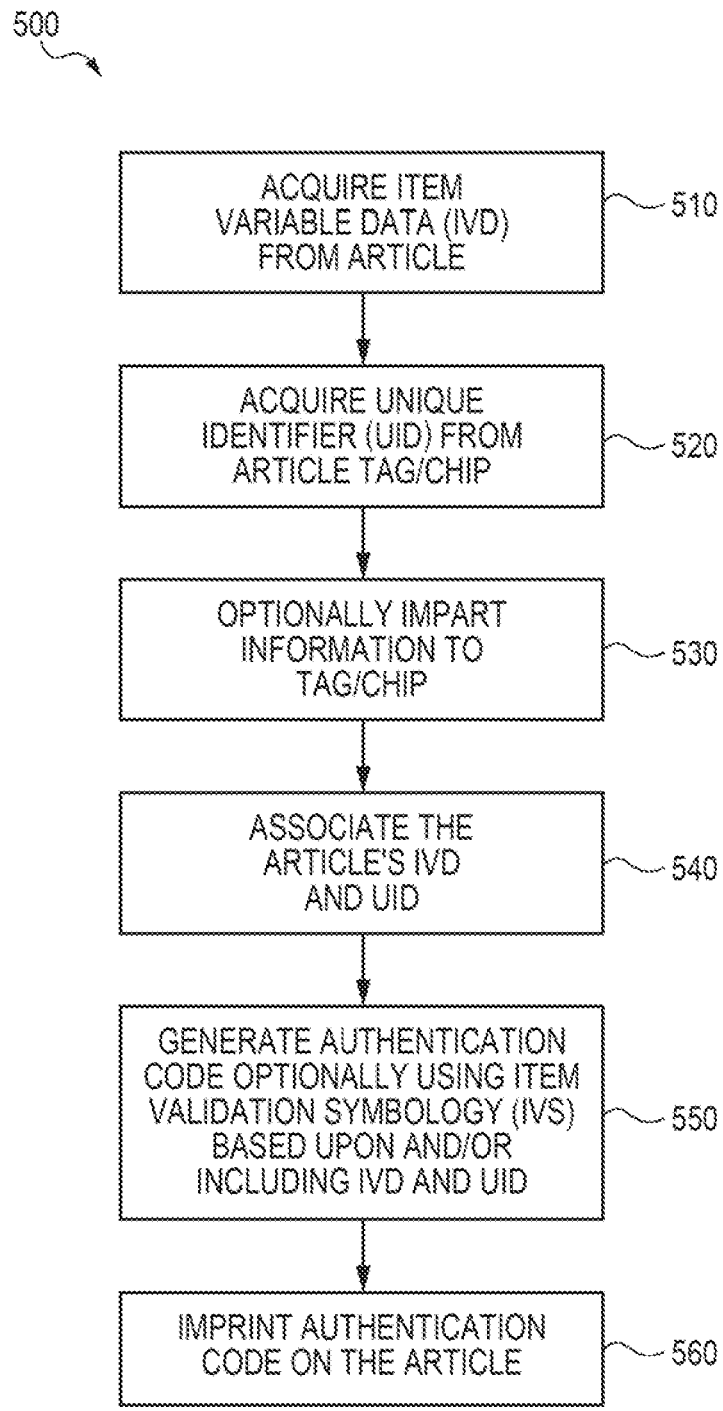
FIG. 6 is a schematic flowchart for a method of deriving an authentication code and applying such to an article, in accordance with an embodiment of the present subject matter.

FIG. 6 is a representative flowchart for a method 500 of deriving an authentication code and applying such code to an article and/or its packaging in accordance with an embodiment of the present subject matter. The method 500 generally comprises one or more operations 510 in which item variable data (IVD) is acquired regarding a particular article. A single IVD or multiple IVDs can be acquired for a single article or groups of articles. Operation(s) 510 can be performed for example by the vision system 14 in the system 100 of FIG. 1 or by the vision system 114 in the system 200 of FIG. 2.

The method 500 also comprises one or more operations 520 of acquiring a unique identifier (UID) from an electronic tag or chip incorporated in the article and/or its packaging. Operation(s) 520 can be performed for example by the electronic reader 16 in the system 100 of FIG. 1 or by the electronic reader 116 of the system 200 in FIG. 2. As previously described, in the acquisition operation(s) 520, a unique identifier (UID) is obtained. The present subject matter also includes acquiring multiple UIDs for a single article, or for multiple articles.

The method 500 may optionally include one or more operations 530 of imparting information to the electronic tag or chip that is incorporated into the article and/or its packaging. For example, in certain applications it may be desired to include time and/or date information to the article, geographic information, or the like.

The method 500 also comprises one or more operations 540 of associating an article's IVD and UID. Typically, such association is performed such that upon identifying one of an IVD or UID, its associated counterpart can be identified. Association can be performed using known database record operations and can be maintained in the line control system computer 20 of the system 100 in FIG. 1 or the product index record generation system 140 of the system 200 of FIG. 2 for example.

The method 500 also generates or derives an authentication code for a particular article using at least one of the article's IVD and/or UID. These operation(s) are collectively shown as 550 in FIG. 6. In certain embodiments of the present subject matter, the generation of an article's authentication code is performed using the previously described item validation symbology (IVS) based upon and/or including the article's IVD and/or UID.

The method 500 also comprises one or more operations 560 of imprinting the authentication code on the article. Referring to FIG. 1 for example, this can be performed by the imprinter 18 of the system 100. This can also be performed by the imprinter 118 of the system 200 shown in FIG. 2.

Figure 7:
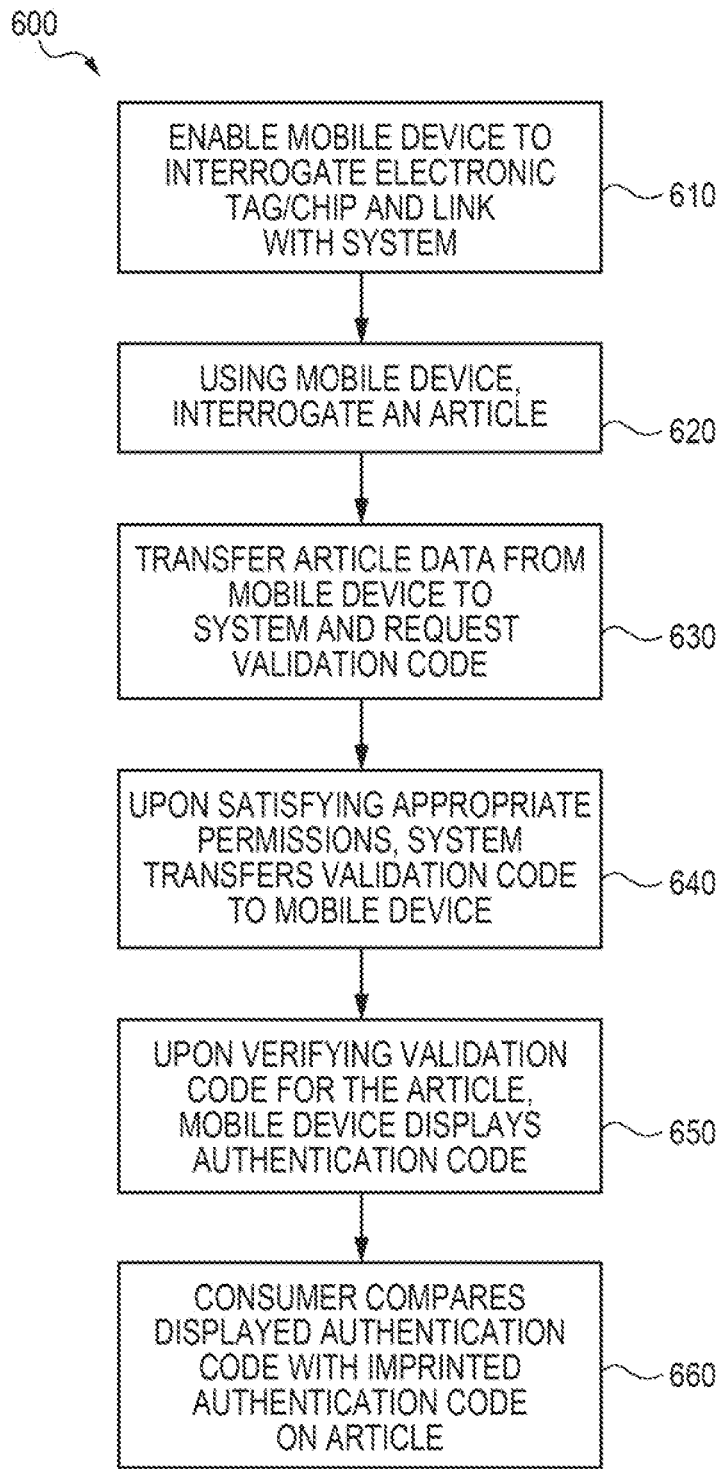
FIG. 7 is a schematic flowchart for a method of evaluating whether an article is a legitimate article, in accordance with an embodiment of the present subject matter.

FIG. 7 is a representative flowchart for a method 600 of evaluating or determining whether an article containing an authentication code as described herein and typically imprinted thereon, is a legitimate article. An example of an article containing an authentication code may include an article displayed for purchase at a retail venue. The method 600 comprises one or more operations 610 of enabling a mobile device to interrogate an electronic tag/chip associated with the article and link or otherwise communicate with an information processing and data storing system. The information processing and data storing system typically includes information processing provisions and communication provisions which enable a suitably configured mobile device to communicate with the system, request information from the system such as one or more validation codes and/or authentication codes as described herein. The system also includes processing provisions and communication provisions that enable the system to transfer or otherwise provide information to the mobile device. In certain embodiments, the system corresponds to the systems as described herein. A mobile device can be configured to interrogate an electronic tag or chip by use of an appropriate reader and/or software. As previously described herein, an NFC tag can be interrogated by a mobile device having an NFC tag reader.

The mobile device is also configured to interface or communicate with the system such as by enabling the mobile device to provide article/device data to a content management server 30 of FIG. 1 or the server 230 of FIG. 2; and receive validation/authentication information from a product index system such as 40 in FIG. 1 or the product index system 240 in FIG. 2. The mobile device may be appropriately enabled by running a software application or app which performs the appropriate data processing and communication.

The method 600 also comprises an operation 620 in which a user interrogates an article of interest using the mobile device. Interrogation can be performed as previously described in conjunction with FIGS. 4 and 5.

The method 600 also comprises one or more operations of transferring article data acquired by the mobile device to the system and requesting a validation code. These operations are collectively shown as 630 in FIG. 7. These operations can be performed by data transfer from the mobile device to a content management server 30 in system 100 of FIG. 1 or the content management server 230 in system 300 of FIG. 3. As previously explained, that data or information typically includes the IVD and/or UID of the article of interest and may also include information associated with the mobile device. These operations 630 also include requesting a validation code from the system, which may include such request from the content management server, e.g., 230 in FIG. 3, made to a product index system such as 240 in FIG. 3.

The method 600 also comprises one or more operations 640 of transferring validation code(s) from the system to the mobile device. Typically, such transfers are performed after one or more evaluations are conducted to ensure that the request is appropriate and made from an authorized user and/or mobile device. A mobile device may become authorized for example upon downloading an app related to the system as described herein and/or conducting verification methods.

The method 600 also comprises one or more operations 650 of displaying an authentication code on a mobile device. The operations 650 may include one or more evaluations to verify that the previously received validation code is appropriate and in response to a request from the mobile device. Typically, the authentication code is displayed on a display or monitor of the mobile device. However, the present subject matter includes other types of information outputs such as display on remote devices associated with the mobile device. Nonlimiting examples of remote devices include near eye display devices such as glasses or eyepieces, wrist bands having displays, and watches or other wearable electronic devices having displays and which can receive data or communicate with the mobile device. In certain applications, one or more of these devices could be used as the mobile device if appropriately configured. Combinations of any of these with previously noted mobile devices could also be used. It is also contemplated that the mobile device could be appropriately configured to emit an audible signal such as a spoken word or phrase which corresponds to the authentication code.

The method 600 also comprises one or more operations 660 in which a consumer or other user compares the displayed authentication code from the mobile device with the imprinted authentication code on the article of interest. If the displayed code is the same as the imprinted code, this indicates that the article has a very high probability of originating from its indicated source. In many applications, this indicates that the article in fact did originate from its indicated source.

Figure 8:
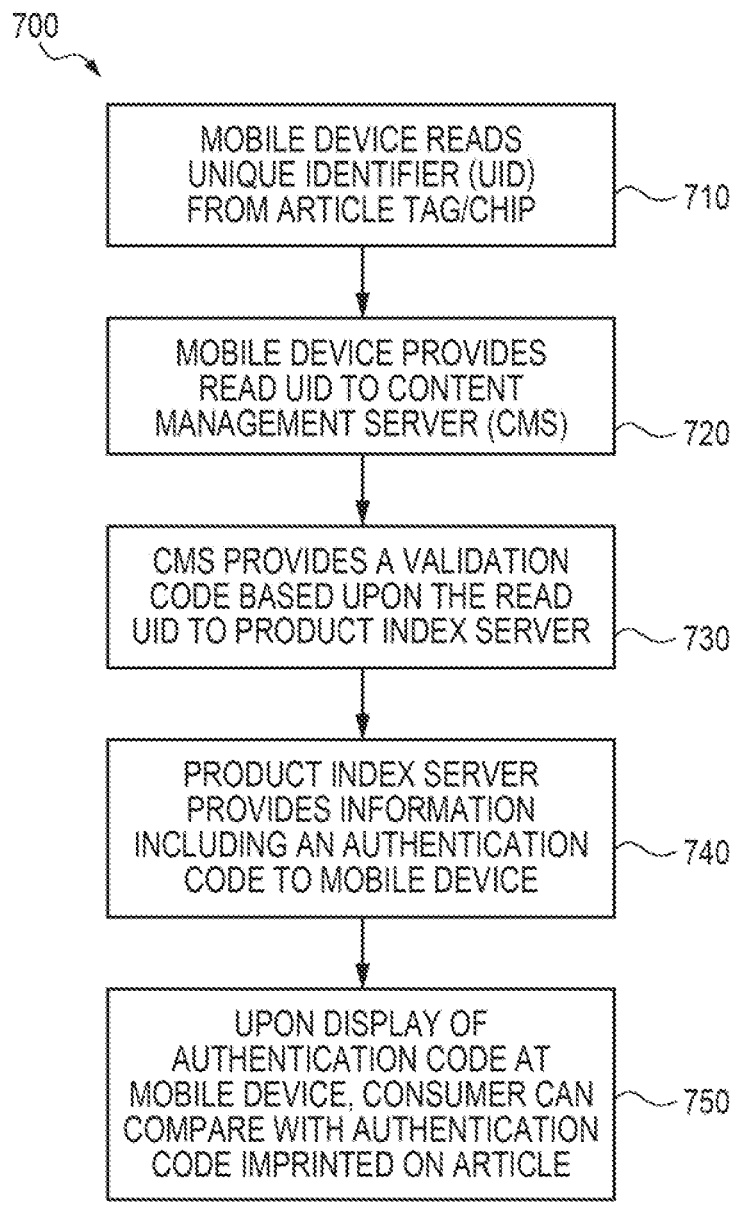
FIG. 8 is a schematic flowchart for another method of evaluating whether an article is a legitimate article, in accordance with another embodiment of the present subject matter.

FIG. 8 is a representative flowchart for a method 700 of evaluating or determining whether a previously manufactured or processed article containing an authentication code as described herein and typically imprinted thereon, is a legitimate article. As previously described, in accordance with the present subject matter, a product index server utilized or updated pursuant to the manufacturing or processing of the article retains a unique identifier that includes the IVD and the UID of the article. The method 700 comprises one or more operations 710 in which a mobile device reads a UID from an article's electronic tag or chip. Typically, the operation(s) 710 are performed by a consumer at a retail venue or point of sale location.

The method 700 also comprises one or more operations in which the mobile device provides the read UID from operation 710, to a content management server (CMS).

The method 700 also comprises one or more operations 730 in which the CMS provides a validation code based upon the read UID to a product index server.

The method 700 also comprises one or more operations 740 in which the product index server from operations 730 provide information including an authentication code to the mobile device.

And, the method 700 also comprises one or more operations 750 in which upon display of the authentication code at the mobile device, a consumer can compare the displayed code with the authentication code imprinted on the article.

In certain embodiments, the present subject matter also provides article tracking systems. A tracking system may function in any of a variety of manners. In one exemplary embodiment, a user or consumer may utilize a tracking system to use a NFC-enabled mobile phone or device to read an NFC RFID tag associated with an article and access content linked to that tag using a software application available from a third party and/or for purchase at an application store.

In further exemplary embodiments, an article tracking system can be developed and set up in any of a variety of manners. NFC RFID tags may be manufactured, assembled into an inlay, written with tag identification data, mapped to or otherwise affixed to an article, and have the mapping data stored in a database, for example the database associated with events or other data pertaining to the article. The tags may be associated or coupled to any desired article(s), for example through the use of adhesive, mechanical fasteners (e.g., hook and loop fasteners, rivets, ties, etc.) or otherwise integrating the tag(s) into article packaging or the article itself, similar to uses of RFID tags, inlays and labels. The NFC RFID tag can be placed adjacent to, beneath or otherwise associated with a bar code label. Also, during this process, article content can be uploaded to a database associated with the tracking system from the tag which may also be encoded during the placing or associating with the article. This can include populating content templates, customizing content as desired, creating logic to personalize or target the content, map the content to a specific tag and input all content and logic into the tracking. After a NFC RFID tag is read by a mobile device, or other device having a scanner or reader, the appropriate data may be transmitted, encrypted or not, from a server to the mobile device and appropriate data may be transmitted, encrypted or not, from the mobile device or portable reader to a server.

The present subject matter can be used in efforts to prevent or at least reduce the potential for counterfeit goods in a wide array of industries and market segments. Nonlimiting examples of these fields include apparel and fashion accessories such as shoes, purses, bags, designer jeans, watches, and other such items; wine and spirits; other beverages; media products such as compact discs, videotapes, DVDs, computer software, music, movies, and video games; medication or pharmaceuticals including prescription medication and OTC drugs and agents; food; cigarettes; health and beauty products such as cosmetics; and a wide range of durable goods.

It will be understood that in certain embodiments the present subject matter includes the use of visual indicia such as printed codes which can be used instead of, or in addition to, the electronic tag or device.

Many other benefits will no doubt become apparent from future application and development of this technology.

All patents, published applications, standards, and articles noted herein are hereby incorporated by reference in their entirety.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

All of the features disclosed in this specification (including any accompanying claims, abstract and drawings), and/or all of the steps of any method or process or components of systems so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A system for determining authenticity of an article having a unique item variable data (IVD) and an authentication code, the authentication code imprinted on at least one of the article and article packaging, the system comprising:
    an electronic tag or device having a size and form suitable for incorporation in at least one of the article and the article packaging, the electronic tag or device retaining a unique identifier (UID);
    at least one product index server for associating the IVD and the UID of the article and retaining an identifier that includes the IVD and the UID;
    at least one content management server (CMS) in communication with the product index server retaining the identifier that includes the IVD and the UID; and
    at least a reader device including (i) provisions for communication with the electronic tag or device incorporated in the article and/or its packaging and reading the UID of the article, and (ii) provisions for communication with the CMS;
    wherein upon communication between the reader device and the CMS, the reader device is configured to provide the UID read from the article to the CMS, the CMS provides a validation code based upon the read UID to the product index server retaining the identifier, and the product index server provides information including an authentication code to the reader device thereby enabling determination of authenticity of the article by comparison of the authentication code provided to the reader device with the authentication code imprinted on the article.

2. The system of claim 1 wherein the electronic device is an NFC tag.

3. The system of claim 1 wherein the electronic device is an RFID device.

4. The system of claim 1 wherein the electronic device is an LEB device.

5. The system of claim 1 wherein the electronic device is an IR device.

6. The system of claim 5 further comprising:
    a processing line including (i) at least one vision system for acquiring the IVD of the article, and (ii) at least one electronic encoder/reader for imparting the UID of the article to the electronic device or reading the UID of the article from the electronic device;
    wherein the vision system and the electronic encoder/reader are in communication with the line control system computer.

7. The system of claim 6 wherein the processing line further includes an imprinter for applying a visible identifier to the article.

8. The system of claim 7 wherein the imprinter is in communication with the line control system computer.

9. The system of claim 6 wherein the visible identifier includes an authentication code.

10. The system of claim 6 wherein the processing line further includes at least one transport assembly for transporting the article past the vision system and the electronic encoder/reader.

11. The system of claim 1 wherein the IVD is at least one of a serial number and a batch number associated with the article.

12. The system of claim 1 wherein the reader device is selected from a mobile device and a stationary device.

13. The system of claim 1 wherein the device is a mobile device selected from the group consisting of a mobile telephone, a smart phone, a personal data assistant, a tablet computer, a personal computer, near eye display devices, wearable electronic devices, and combinations thereof.

14. The system of claim 1 further comprising:
    a line control system computer in communication with the CMS, the line control system computer retaining information relating to the IVD of the article and the UID of the article.

15. The system of claim 1 wherein the electronic device is incorporated within or affixed to at least one of the article and packaging of the article.

16. A method of deriving an authentication code and applying the code to at least one of an article and packaging of the article, the method comprising:
    acquiring item variable data (IVD) from the article;
    acquiring unique identifier(s) (UID) from an electronic device having a size and form suitable for incorporation in at least one of the article and packaging of the article;

associating the IVD of the article with the UID of the article;

generating an authentication code based upon the IVD and the UID of the article;

imprinting the authentication code on at least one of the article and packaging of the article.

17. The method of claim 16 wherein the acquiring IVD is performed by at least one vision system.

18. The method of claim 16 wherein the acquiring UID is performed by at least one electronic encoder/reader.

19. The method of claim 16 wherein the imprinting is performed by at least one device selected from the group consisting of printers, markers, labelers, and combinations thereof.

20. The method of claim 16 wherein the electronic device is an NFC tag.

21. The method of claim 16 wherein the electronic device is an RFID device.

22. The method of claim 16 wherein the electronic device is an LEB device.

23. The method of claim 16 wherein the electronic device is an IR device.

24. The method of claim 16 wherein the electronic device is incorporated within or affixed to one of the article and packaging of the article.

25. A method for determining whether an article is a legitimate article, the article having an electronic device incorporated within or affixed to at least one of the article and its packaging, the electronic device retaining a unique identifier (UID), the article having an authentication code imprinted thereon, the method comprising:

using an appropriately configured mobile device, interrogate the article and obtain UID;

transferring the UID from the mobile device to a system having information processing provisions and communication provisions, and requesting a validation code from the system;

transferring the validation code from the system to the mobile device;

verifying the transferred validation code corresponds to the interrogated article;

if the transferred validation code corresponds to the interrogated article, then display an authentication code on the mobile device;

comparing the displayed authentication code with the authentication code imprinted on the article.

26. The method of claim 25 wherein the electronic device is an NFC tag.

27. The method of claim 25 wherein the electronic device is an RFID device.

28. The method of claim 25 wherein the electronic device is an LEB device.

29. The method of claim 25 wherein the electronic device is an IR device.

30. The method of claim 25 wherein the mobile device is selected from the group consisting of a mobile telephone, a smart phone, a personal data assistant, a table computer, a personal computer, near eye display devices, wearable electronic devices, and combinations thereof.

31. A method for determining whether an article is a legitimate article, the article containing an authentication code and having an electronic device incorporated within or affixed to one of the article and its packaging, the electronic device retaining a unique identifier (UID), the method comprising:

providing a system including a content management server (CMS) and a product index server in communication with the CMS;

providing a mobile device configured to interrogate the electronic device;

using the mobile device, interrogating the electronic device and acquire the UID of the article;

transmitting the acquired UID from the mobile device to the CMS of the system;

providing a validation code from the CMS to the product index server of the system, the validation code corresponding to the transmitted acquired UID;

providing an authentication code from the product index server to the mobile device;

displaying the authentication code on the mobile device.

32. The method of claim 31 further comprising:

comparing the displayed authentication code with the authentication code contained on the article.

33. The method of claim 31 wherein the electronic device is an NFC tag.

34. The method of claim 31 wherein the electronic device is an RFID device.

35. The method of claim 31 wherein the electronic device is an LEB device.

36. The method of claim 31 wherein the electronic device is an IR device.

37. The method of claim 29 wherein the mobile device is selected from the group consisting of a mobile telephone, a smart phone, a personal data assistant, a table computer, a personal computer, near eye display devices, wearable electronic devices, and combinations thereof.

* * * * *